United States Patent [19]

Foundos

[11] 4,213,251
[45] Jul. 22, 1980

[54] APPARATUS FOR DETERMINING THE RESULT OF ANSWERS TO A SET OF RELATED QUESTIONS

[75] Inventor: Stavros Foundos, Wembley Park, England

[73] Assignee: National Research Development Corporation, London, England

[21] Appl. No.: 940,312

[22] Filed: Sep. 7, 1978

[30] Foreign Application Priority Data

Sep. 19, 1977 [GB] United Kingdom ............... 38926/77

[51] Int. Cl.² .............................................. G09B 3/06
[52] U.S. Cl. ....................................... 35/9 R; 35/9 H
[58] Field of Search ................. 35/8 R, 9 R, 9 E, 9 H, 35/48 A, 2

[56] References Cited

U.S. PATENT DOCUMENTS

| 2,984,018 | 5/1961 | Coleman et al. | 35/9 R |
| 3,251,141 | 5/1966 | MacRae | 35/2 |
| 3,478,440 | 11/1969 | Ritchie et al. | 35/9 H |
| 3,541,702 | 11/1970 | Cohen | 35/9 R |

Primary Examiner—John W. Shepperd
Attorney, Agent, or Firm—Blanchard, Flynn, Thiel, Boutell & Tanis

[57] ABSTRACT

A method for determining the result of answers to a set of related questions each having at least two answers which includes operating, in accordance with answers selected by the operator, respective answer devices for all the questions. The answer devices when operated present answer symbols forming part of an array, which can be an array in which all possible combinations of answers to the questions are represented, as in a complete decision table. After operation of all the answer devices, the presented answer symbols define not more than one complete path through the array. By following the path the operator is led to one reference out of a set of references carried by a record member.

11 Claims, 14 Drawing Figures

Fig.1

| QUESTION 1: HAS THE INCOME ARISEN IN THE U.K.? | N | N | Y | Y |
|---|---|---|---|---|
| QUESTION 2: IS THE TAXPAYER RESIDENT IN THE U.K.? | N | Y | N | Y |
| A: THE INCOME IS TAXABLE | | | X | X |
| B: THE REMITTED INCOME IS TAXABLE | | X | | |
| C: THE INCOME IS NOT TAXABLE | X | | | |

Fig.2

| QUESTION 1: HAS THE INCOME ARISEN IN THE U.K.? | N | N | Y |
|---|---|---|---|
| QUESTION 2: IS THE TAXPAYER RESIDENT IN THE U.K.? | N | N | — |
| A: THE INCOME IS TAXABLE | | | X |
| B: THE REMITTED INCOME IS TAXABLE | | X | |
| C: THE INCOME IS NOT TAXABLE | X | | |

FIG. 3

| QUES. 1. | N | N | Y |
|---|---|---|---|
| QUES. 2. | N | Y | — |
| A | | | X |
| B | | X | |
| C | X | | |

FIG. 4

| QUES. 1. | N | N | Y |
|---|---|---|---|
| QUES. 2. | N | Y | — |
| A | | | X |
| B | | X | |
| C | X | | |

(labels: 12, 10, 11)

FIG. 5

| QUES. 1. | | | |
|---|---|---|---|
| QUES. 2. | | | |
| A | | | X |
| B | | X | |
| C | X | | |

APPARATUS FOR DETERMINING THE RESULT OF ANSWERS TO A SET OF RELATED QUESTIONS

FIELD OF THE INVENTION

The invention relates to an apparatus for determining the results of answers to a set of related questions each having at least two answers.

BACKGROUND OF THE INVENTION

The word 'question' as used in this specification is intended to include any statement, which may be a statement in symbolic form, to which there are a plurality of responses. The word 'answer' is intended to include any such response for example, true, false; yes, no; less than, equal to, greater than.

Many situations can be described by the answers to a series of questions. There may be many questions in the series and hence a large number of ways in which the answers can be combined in a set having one answer to each question. Associated with each set of answers there may be an instruction concerning the action to be taken in the situation described by that set of answers. The questions, sets of answers and instructions can be presented in a decision table in which the questions are arranged, for example, in a column and the answers are arranged in an array adjacent the column of questions, each column of the array being unique and corresponding to a unique set of answers. The instructions are associated with the columns of the array of answers. A person wishing to use the decision table to assist him in choosing the action to be taken in a situation must first describe the situation by a set of answers to the questions of the decision table. He must then search through the array of answers to find the column which corresponds to that set and hence the associated instruction. The invention provides an apparatus to assist in the search through the array.

According to the invention in a first aspect there is provided a method for determining the result of answers to a set of related questions each having at least two answers, wherein for all the questions respective answer devices are operated to present, in accordance with answers selected by the operator, answer symbols forming part of an array, the presented answer symbol or symbols associated with each question being disposed in a line of the array, all the presented symbols defining not more than one complete path through the array which leads the operator to a single reference out of a set of references carried by a record member.

According to the invention in a second aspect there is provided apparatus for determining the result of answers to a set of related questions each having at least two answers, comprising, for every question, an answer device which is operable to present, in accordance with answers selected by the operator, answer symbols forming part of an array, the presented answer symbol or symbols associated with each question being disposed in a line of the array, all the presented symbols defining not more than one complete path through the array which leads the operator to a single reference out of a set of references carried by a record member.

BRIEF DESCRIPTION OF THE DRAWINGS

The invention will be further described by way of example and with reference to the accompanying drawings in which.

DETAILED DESCRIPTION

Figure 1:
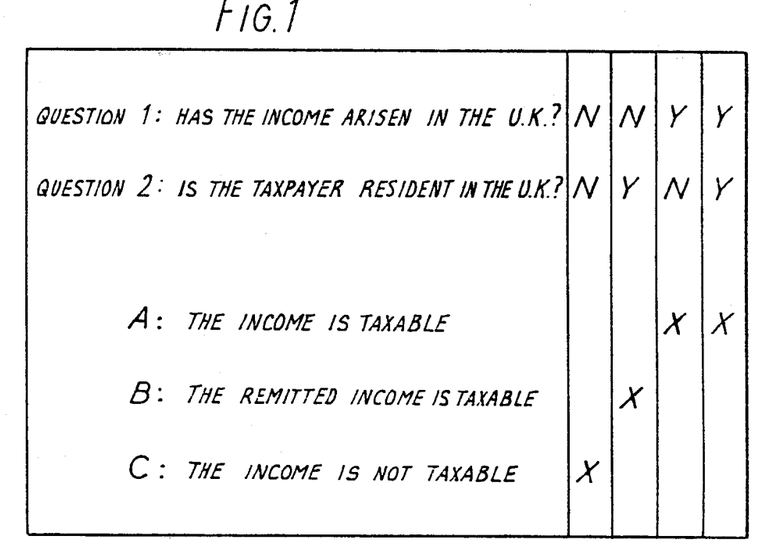
FIG. 1 is a decision table showing all possible combinations of answers to two questions.
Figure 2:
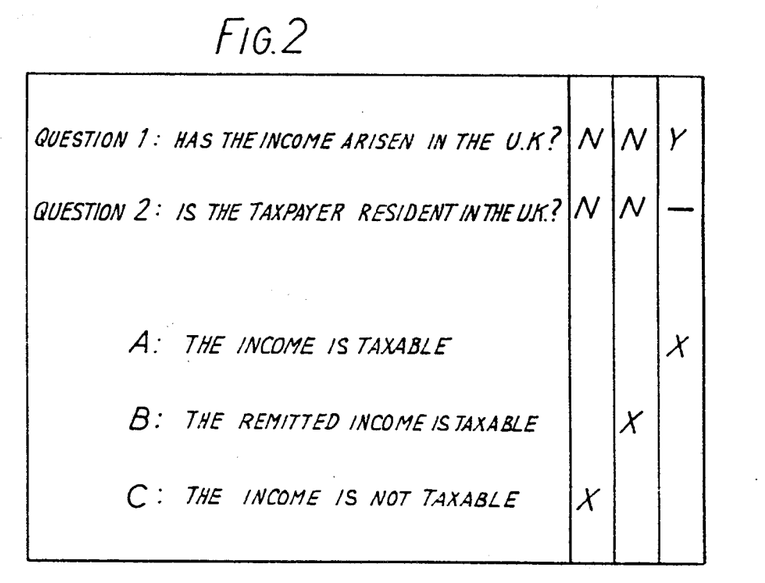
FIG. 2 is an abridged version of the decision table of FIG. 1.

FIGS. 1 and 2 show decision tables relating to a simple problem in tax law. To decide whether income is taxable two questions must be answered—Has the income arisen in the U.K.? Is the taxpayer resident in the UK? Each question has only two possible answers—Yes and No. In FIG. 1, adjacent the questions is shown an array of answer symbols in which the columns represent the four possible combinations of answers to the two questions, NN, NY etc. representing No No, No Yes etc. Associated with each combination of answers is a statement of the correct action to be taken in the situation described by that combination of answers, for example if the answers to both questions is No then the income is not taxable.

As there are only three possible actions to be taken, the decision table of FIG. 1 can be abridged to that of FIG. 2. The dash in the third column against the second question indicates that the answer to the second question, when combined with the answer Yes to the first question, does not affect the action to be taken.

Figure 3:
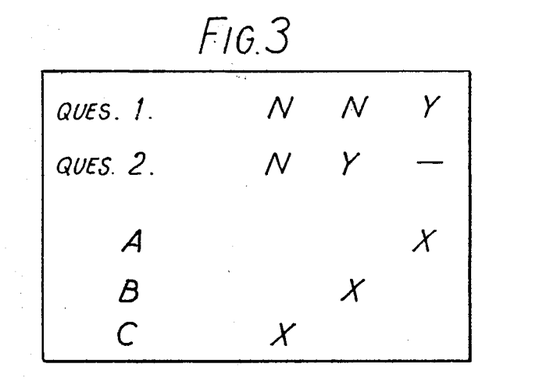
FIG. 3 shows a record member bearing an array of answer symbols corresponding to the decision table of FIG. 2.

Referring to FIG. 3, a complete array of answer symbols, identical to the array shown in FIG. 2, is recorded on a record member adjacent a column of questions which may be written out in full or merely identified by numbers. Below each column of the array there is a cross in line with a reference to the correct action to be taken. The crosses and references are recorded on the record member which is preferably a sheet of paper or cardboard. The symbols Y representing Yes answers are recorded in a different colour to the symbols N representing No answers, for example the Ys are in green and the Ns are in red. The dash, indicating that both answers Yes and No lead to the same reference, is recorded in black as are the crosses, references, and the questions or the numbers which identify the questions.

Figure 4:
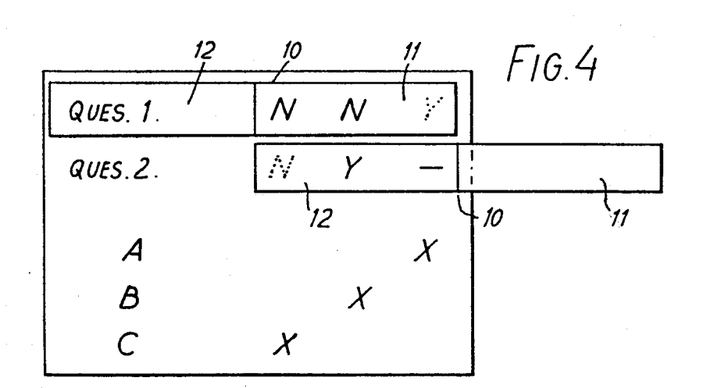
FIG. 4 shows apparatus constructed according to the invention for determining the result of answers to the two questions of the decision table of FIG. 2.

Arranged in front of the record member are two answer devices, one for each question as shown in FIG. 4. Each answer device comprises two portions of transparent colour filter material joined together to form a strip 10. One portion, the right-hand half 11, of each strip 10 is green filter material and one portion, the left-hand half 12, is red, these colours being chosen to correspond to the colours used for the answer symbols. Each portion of colour filter material is large enough to cover a complete line of the array of answer symbols on the record member, the line being that associated with one of the questions. In use of the apparatus each strip is positioned either with the green portion 11 covering the line of the array or with the red portion 12 covering the line of the array, these positions of the strip corresponding to selection of No or Yes answers respectively.

FIG. 4 shows the apparatus in use. The operator has selected the answer No to question one and the answer Yes to question two. The strips of the answer devices have been positioned accordingly, the line of the array associated with questions one being covered by the green portion of the first strip and the line associated with question two being covered by the red portion of the second strip. Consequently, only the red N symbols in the line associated with question one, i.e. the symbols corresponding to the selected answer, are clearly visible, the green Y symbol being virtually indistinguishable from the background when viewed through the portion of green filter material. To illustrate the difference in visibility of the N and Y symbols in the first line of the array, the Y symbol is shown in broken lines in FIG. 4. Similarly in the second line of the array the green Y symbol is clearly visible through the portion of red filter material and the red N is not. The black dash is clearly visible through the red filter material and it would also be visible through the green filter material.

Having selected an answer for each question and operated the answer devices accordingly, the operator merely scans the array to find a complete column of clearly visible answer symbols. There will always be one and only one such column. In FIG. 4 the only complete column of clearly-visible answer symbols is the central column of the array which can be followed like a path through the array. By looking down the column to the black cross and then left along the line containing the cross, the operator is led to the reference B. The explanation of the references can be given on the record member or on a separate sheet of paper or cardboard.

To summarise the procedure with reference to FIGS. 3 and 4, the operator selects an answer for each question and operates the answer devices accordingly. Each answer device, when operated, renders some answer symbols in a line of the array clearly visible and obscures the remainder of the symbols in that line. The answer symbols rendered clearly visible are those corresponding to the selected answer. When all the answer devices have been operated several of the answer symbols are clearly visible but there is only one complete column of clearly visible symbols. The operator looks along the column and is led to one reference out of a set of references carried by the record member.

Figure 5:
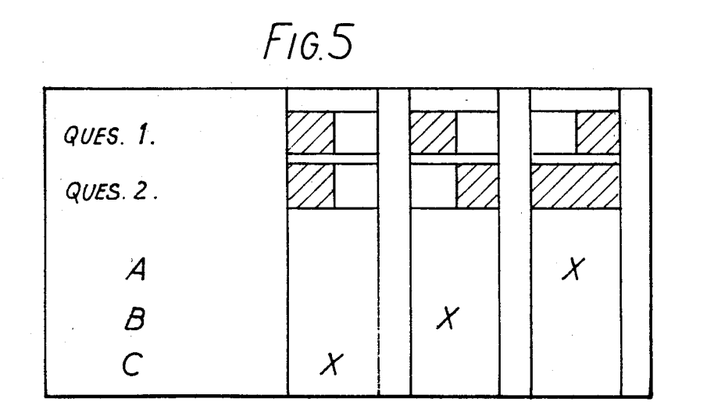
FIG. 5 shows another record member bearing an array of answer symbols corresponding to the decision table of FIG. 2.
Figure 6:
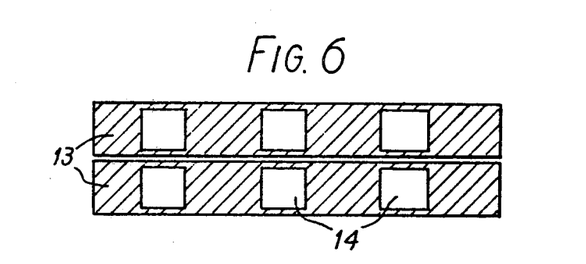
FIG. 6 shows two answer devices for use with the record member shown in FIG. 5.
Figure 7:
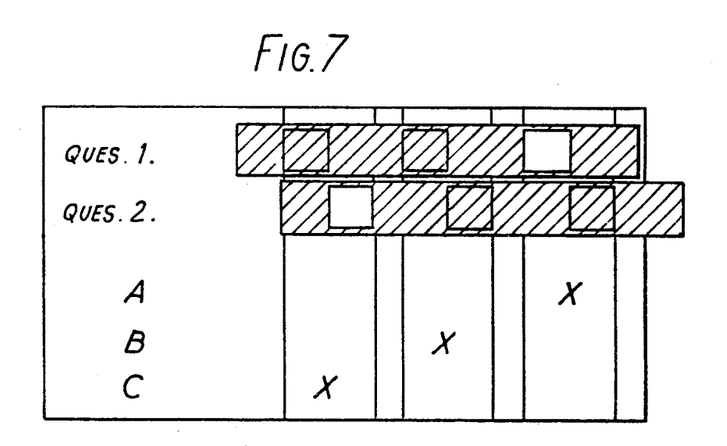
FIG. 7 shows the answer device of FIG. 6 in use with the record member of FIG. 5.

FIGS. 5, 6 and 7 show a similar device to that shown in FIGS. 3 and 4. However, instead of using the letters N and Y to represent No and Yes answers, a black square is used in the left-hand half or right-hand half respectively of a column of the array. FIG. 5 shows a record member on which is recorded the array shown in FIG. 2 together with references to actions to be taken. FIG. 6 shows the answer devices each of which comprises a strip 13 of black paper or cardboard having windows 14 cut out. Each strip 13 has as many windows 14 as there are columns in the array, each window being the same size as the black squares recorded on the record member. As in the device shown in FIG. 4, each strip is arranged in front of the record member in line with a question and, in use, is positioned with the windows 14 either over the left-hand halves of the columns of the array or over the right-hand halves. In FIG. 7 the strip in line with question one is positioned with its windows 14 over the left-hand halves of the columns of the array and this position corresponds to the selection of the answer No. The strip in line with question two is positioned with its windows over the right hand halves of the columns of the array and this corresponds to selection of the answer Yes for question two.

The strips render visible any black squares which fall beneath the windows in the strips. Thus when a strip, such as the strip for question one in FIG. 7, is positioned in accordance with a No answer, only black squares in the left-hand halves of the columns of the array i.e. the black squares which are symbols for No answers, are rendered visible. After operating all the answer devices the operator must look for a complete black column and follow the column down to find the reference to the correct action to be taken. FIG. 7 shows the device in use after operation of the answer devices in accordance with selection of No and Yes answers to questions one and two respectively. The central column is the unbroken black column. The situation shown in FIG. 7 corresponds to that shown for a different device in FIG. 4.

Figure 8:
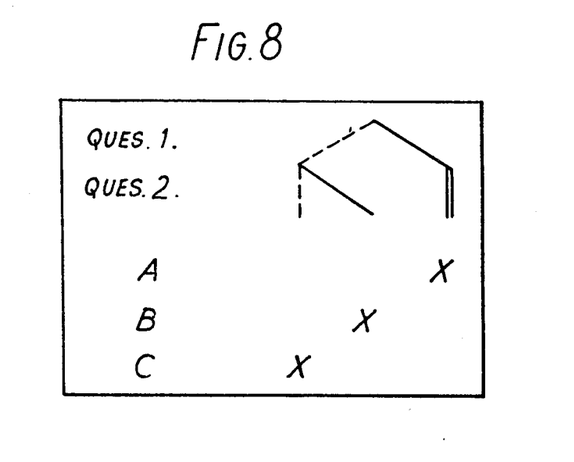
FIG. 8 shows yet another record member bearing an array of answer symbols corresponding to the decision table of FIG. 2.

FIG. 8 shows a record member which can be substituted for the record member shown in FIG. 3 and used with the device shown in FIG. 4. The array of FIG. 2 is recorded on the record member of FIG. 8 as a network of paths commonly called a decision tree. Yes and No answers are represented by different coloured segments of paths, for example green and red segments respectively. To illustrate the use of different colours in FIG. 8, an unbroken line in FIG. 8 represents a green line on the record member, a broken line represents a red line on the record member, and a double line represents a black line on the record member. A black line on the record member indicates that both answers Yes and No give the same result.

It will be noted that there are three distinct paths through the array shown in FIG. 8, a path having two segments, one segment associated with each question. The three paths correspond to the three columns in the decision table of FIG. 2. Directly below the lower end of each path is a black cross on the record member, each cross being in line with a reference to an action to be taken.

The record member of FIG. 8 is for use with answer devices which comprise strips of material each having a portion of green colour filter material and a portion of red colour filter material. The record member can thus replace the record member of FIG. 3 in the device of FIG. 4. In use, the answer devices are operated in accordance with answers selected by the operator. After all the answer devices have been operated some segments of paths are clearly visible whilst the remainder are obscured and there is only one complete path which is clearly visible. The operator follows this path and so locates the reference to the action to be taken.

The paths can be made easier to follow if black dots are recorded on the record member where each segment of a path branches into further segments. It is also advantageous to mark with a dot the black lines which indicate that either answer gives the same result. If this is done the operator can tell which segments of the path will be unaffected by a change in answer without having to operate the answer device concerned.

Figure 14:
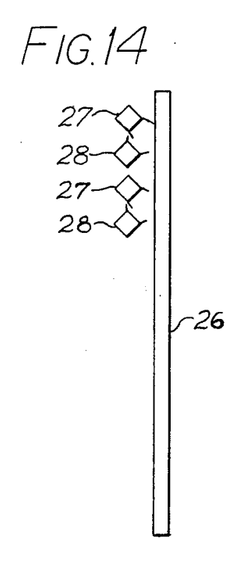
FIG. 14 is a side elevation of another apparatus according to the invention.

In the apparatus described with reference to FIGS. 4, 7 and 8, the answer devices are movable strips which are positioned in accordance with selected answers to render part of an array of answer symbols clearly visible. With reference to FIG. 14, the arrays shown in FIGS. 3, 5 and 8 can be recorded on a sheet of transparent material to produce record members 26 which are suitable for illumination from behind the member using coloured light. Each answer device thus comprises means to evenly illuminate with light of different colours a line of the array associated with one question. For use with the arrays of FIGS. 3, 4 and 8, which have symbols recorded in red, green and black, each answer device would have to provide red and green light. A single light source could be used in combination with filters or there could be two independent light sources 27 and 28. On selection of, for example, a Yes answer to a question the operator would have to operate the answer device associated with that question in order to illuminate the line of the array with red light. This would render the green Yes symbols in that line clearly visible whilst obscuring the red No symbols. When all the answer devices are operated only one complete path of symbols will be clearly visible. The record member can be very small, for example it can be a portion of microfilm, and illuminated by means of fibre optic light guides.

Similarly, when a transparent record member having answer symbols recorded in different colours is used, each answer device can comprise strips of coloured material placed behind a line of the array of answer symbols. For example, if the record member has symbols recorded in red and green, a red strip behind the record member will obscure the red symbols and render the green symbols clearly visible. A transparent record member bearing answer symbols in different colours can be mounted in a projector in order to project the answer symbols on a screen which includes strips of coloure material. Alternatively, coloured strips can be produced on a white screen by incorporating strips of colour filter material in a projector and projecting light of different colours on the screen. When projecting a record member on a screen illuminated by light of different colours, the visibility of the answer symbols is improved if the record member is black, the answer symbols being transparent portions of colour filter materials.

Figure 9:
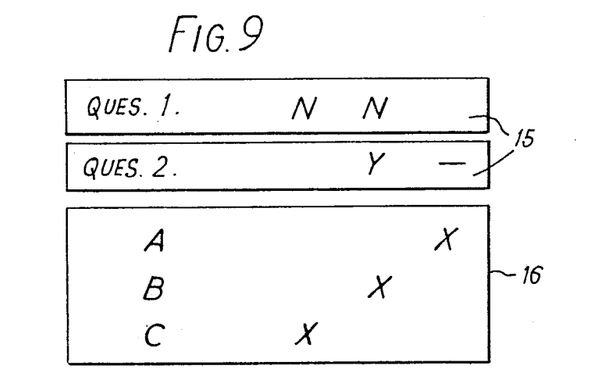
FIGS. 9 and 10 show apparatus constructed according to the invention for determining the result of answers to the two questions of the decision table of FIG. 2.
Figure 10:
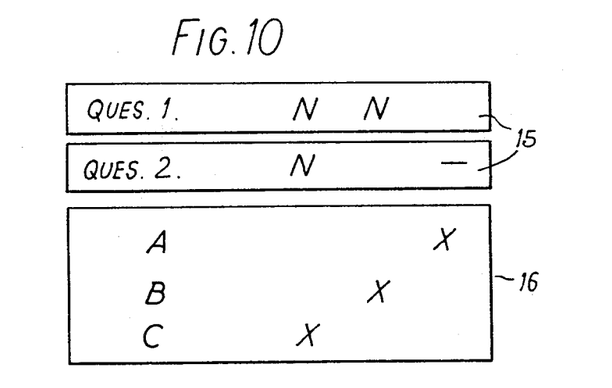

Another type of answer device is shown in FIGS. 9 and 10. The array of answer symbols is not recorded on a record member but is recorded on the strips of material 15 which are the answer devices. A record member 16 carries references to actions to be taken and, in line with the references, crosses to assist in locating the references.

Each answer device comprises a strip of material 15, such as paper or cardboard, on which are recorded the answer symbols from one line of the array of symbols shown in FIG. 2. The answer symbols are not all recorded on one side of the strip but are divided into Yes symbols and No symbols which are recorded on opposite sides of the strip. The dash which indicates that both answers give the same result is recorded on both sides of a strip. The symbols on one side of a strip have the same relative positions as the corresponding symbols in the array of FIG. 2. When the operator has selected an answer to a question he positions the strip 15 either with the side bearing the Yes symbols uppermost, for a Yes answer, or with the side bearing the No symbols uppermost, for a No answer. When all the answer devices have been operated the operator scans the answer devices to find a complete column of answer symbols which leads him to the reference to an action to be taken. In FIG. 9 the operator has selected answers No and Yes to questions one and two respectively, positioned the strips accordingly, and is led to reference B. In FIG. 10 the operator has selected answers No and No to the questions, positioned the strips accordingly, and is led to reference C.

Figure 11:
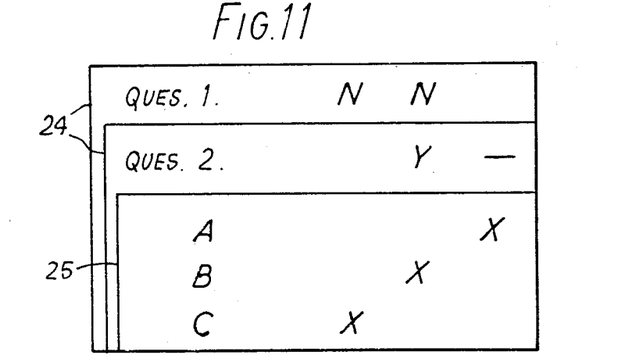
FIG. 11 shows another apparatus constructed according to the invention for determining the result of answers to the two questions of the decision table of FIG. 2.

FIG. 11 shows apparatus similar to that shown in FIGS. 9 and 10. The apparatus comprises two answer devices 24 and a record member 25, which is identical to the record member 16 shown in FIGS. 9 and 10. Each answer device 24 is a sheet of material, for example paper, which extends behind the record member and which has a question and answer symbol corresponding to one answer to the question recorded on one side of the sheet along the upper edge. The sheets are of different sizes and are arranged behind the record member such that when the lower edges of the sheets are level with the lower edge of the record member, the symbols recorded along the upper edges of the sheets are visible. Each answer device 24 has the answer symbols corresponding to the different answers to a question recorded along the upper edge of opposite sides of the sheet in a similar manner to that in which symbols are recorded on the strips 15 shown in FIGS. 9 and 10. In use of the apparatus, the operator selects an answer to each question, positions the sheets such that the answer symbols corresponding to the selected answers are visible and scans the visible symbols for a complete column of symbols. FIG. 11 shows the situation when the answer devices 24 have been operated in accordance with the answers No and Yes to questions one and two respectively and so corresponds to FIG. 9.

When the answer devices comprise sheets of material as shown in FIG. 11, each answer device has four portions in which answer symbols can be recorded, i.e. along the upper and lower edges and on both sides of the sheet. Such answer devices can be used with questions each having as many as four answers, for example, with questions having four different answers, each of the said four portions of a sheet bears answer symbols corresponding to one of the four possible answers to a question.

Figure 12:
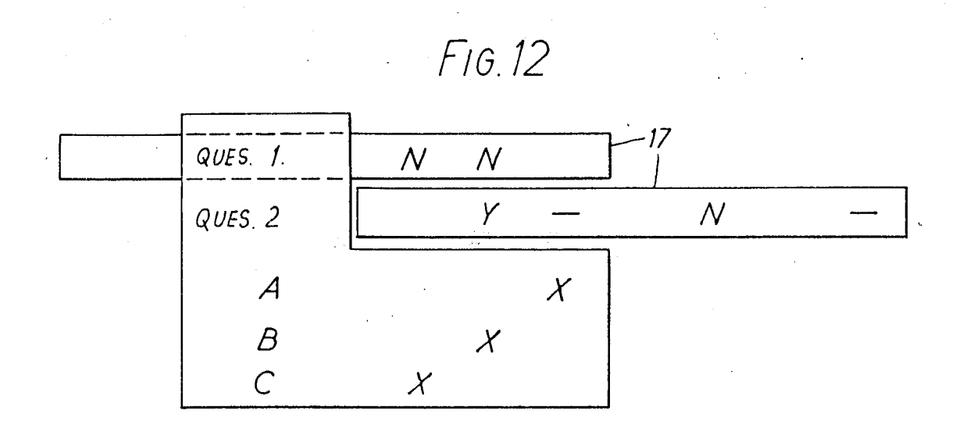
FIG. 12 shows yet another apparatus constructed according to the invention for determining the result of answers to the two questions of the decision table of FIG. 2.

In FIG. 12 is shown apparatus which is very similar to that shown in FIGS. 9 and 10 except that the Yes and No symbols are recorded in different portions of one side of a strip of material 17 instead of on opposite sides. The situation shown in FIG. 12 is equivalent to that shown in FIG. 9. The symbols Y and N could be replaced by vertical strokes because the operator has merely to search for a complete column of symbols. He does not need to be able to distinguish between the Yes and No symbols providing he knows, from the position of an answer strip 17, whether the strip has been positioned in accordance with a Yes answer or a No answer. If the Y and N symbols in the apparatus of FIG. 12 were replaced by embossed vertical strokes, the apparatus could be used by a blind operator.

Figure 13:
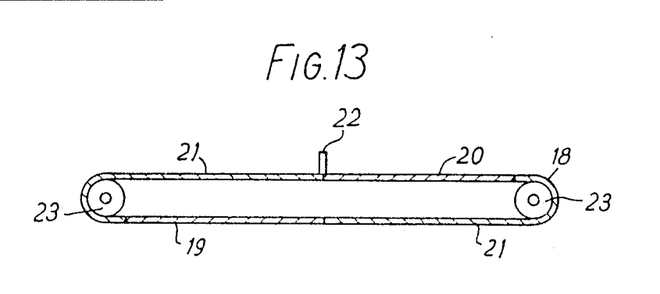
FIG. 13 is a section through an answer device for use with the record member of FIG. 3 or 8.

FIG. 13 is a section through an answer device suitable for use with the record member of FIG. 3 or 8. The answer device comprises an endless belt 18 having a portion 19 of green colour filter material and a portion 20 of red colour filter material, the two filter portions being separated by two transparent portions 21. A handle 22 is fixed to the belt to enable the operator to move the belt around the tensioning rollers 23 and so position the red portion 20 or the green portion 19 over a line of the array recorded on a record member. Any of the answer devices described which comprise strips of material can be adapted to use a belt similar to that shown in FIG. 13.

In all of the examples described, the apparatus is based on the decision table of FIG. 2, which is a complete decision table in the sense that all possible combinations of answers to the two questions are represented. After operation of all the answer devices in an apparatus based on a complete decision table, the presented answer symbols will always define one and only one path through the array. This feature can be used as a check on the completeness of the decision table on which the apparatus is based. When there are many questions, and hence many combinations of answers, it can be advantageous to produce an incomplete decision table which does not include those combinations of answers which are of no interest to the operator. In an apparatus which is based on such an incomplete decision table, the presented answer symbols will not define a path through the array when the answer devices have been operated in accordance with a combination of answers which is of no interest to the operator.

It will be appreciated that the invention is not limited to the examples of apparatus and methods described. The invention is obviously not limited to problems in tax law nor to situations described by answers to two questions. In fact, it is in connection with situations described by the answers to a large number of questions that the advantages of the inventio become apparent. Scanning some presented portions of a large array of symbols for a complete column or path is much simpler than looking at each column of the complete array to find the column with a particular combination of answers.

The questions need not have only two possible answers and use of the apparatus shown in FIG. 11 with questions having more than two answers has been described. The apparatus shown in FIG. 12 can easily be adapted for use with questions having more than two answers by making each strip longer and recording the symbols corresponding to the different answers to any one question in different portions of one side of the strip. Apparatus having answer symbols recorded in different colours on a record member can be adapted for use with questions having three answers. For example, in apparatus similar to that shown in FIG. 4 for use with questions each having three answers, the three different answer symbols are recorded in the secondary colours magenta, yellow and cyan. Covering the array with a colour filter of a primary colour, green, blue or red, would obscure symbols recorded in two of the secondary colours whilst rendering the symbols recorded in the third secondary colour clearly visible.

Some changes can be made to the structure of the devices described without departing from the invention. For example, the apparatus can be adapted for use in projectors or microfilm readers. The answer devices can comprise means to project coloured light on an opaque record member which carries an array of answer symbols of different colours together with references. In apparatus having answer devices which comprise strips of material, any suitable means can be provided for guiding or supporting the strips in the correct position relative to the record member, for example in the apparatus shown in FIG. 4 embossed lines can be provided on the record member and the strips can slide between the lines. A sheet of transparent material can be fixed to the embossed lines thus forming closed channels in which the strips can slide. Magnets can be used to facilitate movement of the strips within the channels.

In apparatus in which answer symbols and references are recorded on a record member, the answer devices can be mounted in a frame in order to enable movement of the answer devices as one unit relative to the record member as the operator scans for a complete path through the array. For example, in apparatus similar to that shown in FIG. 4, the portions of colour filter materials need not be large enough to cover a line of the array if the answer devices can be moved as one unit across the record member as the operator looks for a complete path.

The portions of the array which are to be presented after operation of the answer devices could be generated electronically and displayed on a television screen together with references. In this case the screen becomes a record member for the duration of display of the array and references.

Apparatus in which colour filters are used to differentiate between symbols recorded in different colours can be adapted to use diffraction gratings or materials which polarise light if the symbols are recorded on the record member as portions of compatible diffraction gratings or polarising materials.

I claim:

1. Apparatus for determining the result of answers to a plurality of questions each having at least two answers, comprising a record member, a plurality of references recorded on the record member, each said reference representing the result of a combination of answers which includes an answer to each question, the apparatus further comprising a plurality of answer devices, one for every question, for presenting answer symbols, each said answer device being operable in accordance with an answer selected by the operator to present answer symbols representing the selected answer to the associated question, the presented answer symbols representing the selected answer to any one question being disposed in a line, whereby after operation of answer devices in accordance with answers selected for every question, the presented answer symbols are disposed in a plurality of lines, one line for every question, the said lines being arranged side-by-side immediately adjacent the said references on the record member, the answer symbols presented after operation of all the answer devices defining not more than one path across the lines of presented answer symbols, the said one path leading the operator to one of the said references on the record member, the said one reference being the reference to the result of the combination of the selected answers to the questions.

2. Apparatus according to claim 1, wherein the answer devices present said answer symbols in such a way that the presented answer symbols are clearly visible to the operator.

3. Apparatus according to claim 2, wherein a complete array of said answer symbols is recorded as a table on said record member, the different answer symbols representing the different answers to any one question being recorded in different colors, and wherein each said answer device comprises a strip of material having transparent portions of different color filter materials, the answer device being operated by changing the position of the strip relative to the record member.

4. Apparatus according to claim 2, wherein a complete array of said answer symbols is recorded on said record member as a network of paths, each path branching at every question into further paths recorded in different colors representing the different answers to the question, and wherein each said answer device comprises a strip of material having transparent portions of different color filter materials, the answer device being operated by changing the position of the strip relative to the record member.

5. Apparatus according to claim 2, wherein a complete array of said answer symbols is recorded on said record member, and wherein each said answer device comprises means to illuminate a line of the array with light of at least two different colors, the light being viewed by the operator through the record member, the answer symbols representing the different answers to any one question being recorded as transparent portions of different color filter materials.

6. Apparatus according to claim 1, wherein each said answer device comprises at least one strip of material having said answer symbol recorded thereon, the different answer symbols representing the different answers to any one question being recorded in different portions of the strip or on different strips, the answer device being operated by changing the position of the strip relative to the record member.

7. Apparatus according to claim 6, wherein the different answer symbols representing the different answers to any one question are recorded on opposite surfaces of one said strip of material, the strip being rotatable to enable either surface to be presented.

8. Apparatus according to claim 1, wherein a complete array of said answer symbols is recorded as a table on said record member, and wherein each said answer device comprises a strip of material having windows through which parts of the complete array can be presented, the answer device being operated by changing the position of the strip relative to the record member.

9. Apparatus according to any one of claims 3, 4, 6, 7 or 8, wherein the said strip of material is arranged as a continuous belt.

10. Apparatus according to claim 1, wherein the plurality of questions and a complete array of said answer symbols are recorded as a table on said record member, the answer symbols for each said question being disposed in one said line so that the individual answer symbols in the adjacent side-by-side lines are disposed in transversely extending columns, and each of said references as recorded on said record member having at least a part thereof disposed in substantial alignment with one of said columns.

11. Apparatus according to claim 1, wherein each said question and its associated answer symbols are recorded on a separate said answer device, the plurality of answer devices when associated with the record member resulting in the individual answer symbols on the different answer devices being aligned in columns which also align with the references on the record member.

* * * * *

UNITED STATES PATENT OFFICE
CERTIFICATE OF CORRECTION

Patent No. 4 213 251      Dated July 22, 1980

Inventor(s) Stavros Foundos

It is certified that error appears in the above-identified patent and that said Letters Patent are hereby corrected as shown below:

On the title page, specifically line [30] dealing with FOREIGN APPLICATION PRIORITY DATA, delete "Sep. 19, 1977 [GB] United Kingdom...... 38926/77" and substitute therefor the following:

---Sep. 19, 1977 [GB] United Kingdom ..... 38926/77

May 26, 1978 [GB] United Kingdom ......, 38926/77---.

Signed and Sealed this

Sixth Day of January 1981

[SEAL]

*Attest:*

*Attesting Officer*

SIDNEY A. DIAMOND

*Commissioner of Patents and Trademarks*